United States Patent [19]

Burge

[11] Patent Number: 4,995,439

[45] Date of Patent: Feb. 26, 1991

[54] TIRE BEAD BREAKER

[75] Inventor: Leonard F. Burge, Sheoak - Lot 1, Plenty Road, Yan Yean, Victoria, Australia, 3755

[73] Assignees: Leonard F. Burge; Elaine R. Burge, Yan Yean, Australia

[21] Appl. No.: 469,390

[22] Filed: Jan. 24, 1990

[51] Int. Cl.⁵ .............................................. B60C 25/132
[52] U.S. Cl. ...................................... 157/1.17; 157/1.3
[58] Field of Search ....................... 157/1.1, 1.17, 1.2, 157/1.21, 1.26, 1.28, 1.3

[56] References Cited

U.S. PATENT DOCUMENTS

| | | | |
|---|---|---|---|
| 3,084,728 | 4/1963 | Brosene, Jr. | 157/1.26 X |
| 4,059,140 | 11/1977 | Sedgwick | 157/1.17 |
| 4,121,644 | 10/1978 | Boyle et al. | 157/1.17 |
| 4,524,813 | 6/1985 | Gering | 157/1.17 |

FOREIGN PATENT DOCUMENTS 487887 7/1976 Australia .

*Primary Examiner*—D. S. Meislin
*Attorney, Agent, or Firm*—James C. Wray

[57] ABSTRACT

A tire bead breaker which can be portable comprising a base upon which a tire and wheel can be located and having a stop at one end to restrict outward movement of the wheel and tire, an arm assembly connected to the base at a spacing from the stop to permit a wheel and tire to be located therebetween which carries a breaker assembly pivotally connected thereto which assembly includes telescopic members one of which is connected to the arm and the other of which has a breaker plate at its free end the arrangement being that the breaker plate can be moved towards and located between the rim and the tire and by relative movement between the plate and the stop the breaker plate can move inwardly and a hydraulic or screw jack provided to rotate the breaker assembly about its pivot to effect separation of the tire from the rim.

20 Claims, 3 Drawing Sheets

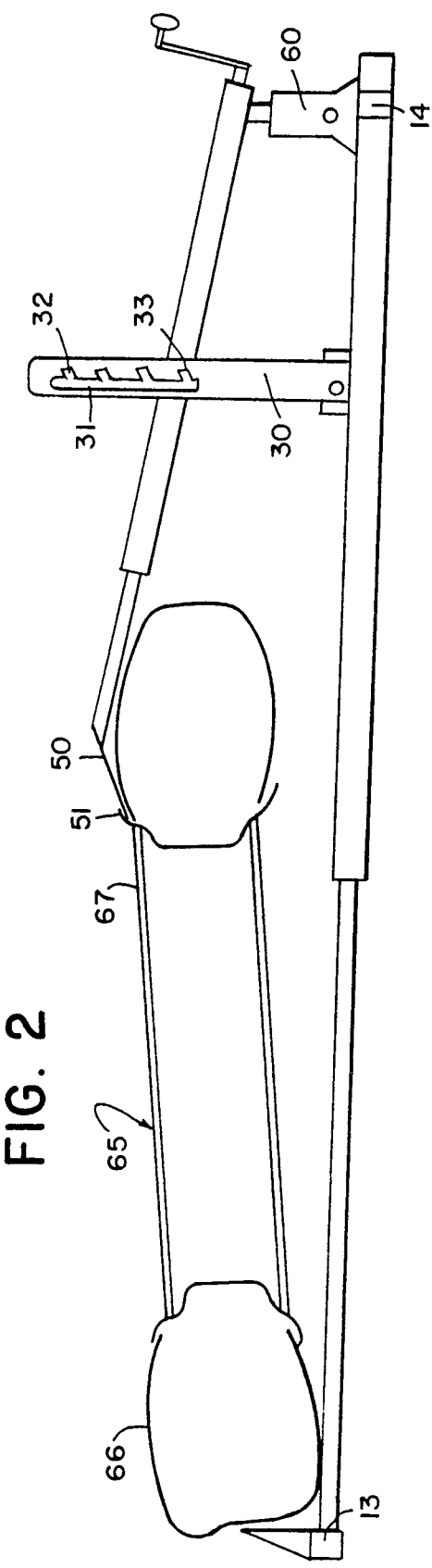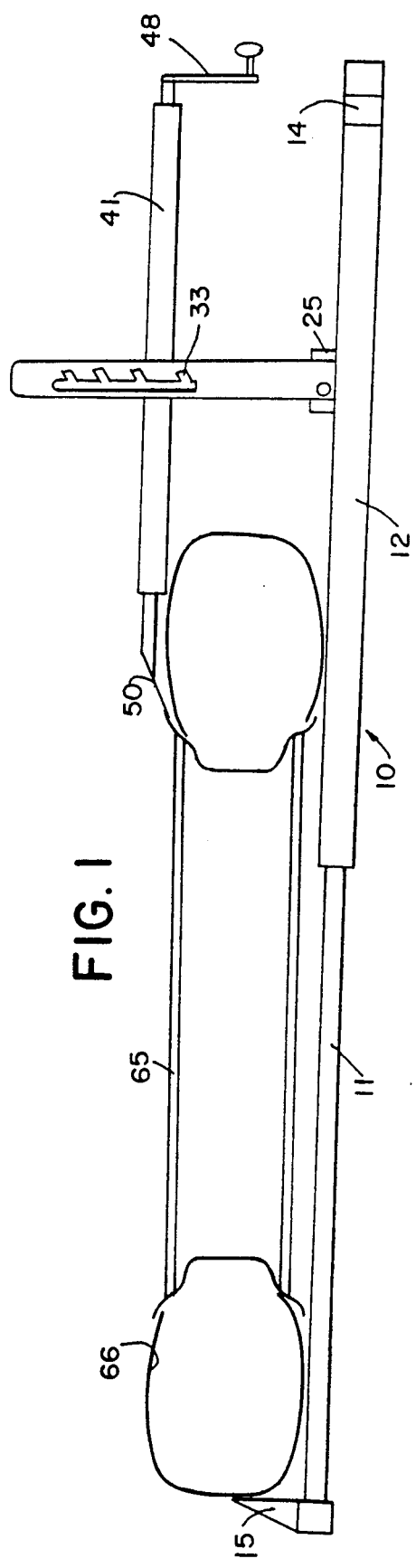

4,995,439

TIRE BEAD BREAKER

BACKGROUND OF THE INVENTION

1. Field of the Invention:

This invention relates to a tire bead breaker and in particular to a bead breaker which is portable.

2. Prior Art:

There have always been certain problems in removing vehicle tires from rims as it is necessary to break the seal between the bead and the rim.

When tires were invariably tubed the rims tended to have a flat surface on which the tire rested and it was possible to break the seal between the tire and the rim, simply by provided an axial force which could be obtained by some form of pressure means or even by inserting a tire lever between the tire and the rim and then causing this to move the tire inwardly.

As tire technology advanced and particularly with the onset of the tubeless tire the rim formation normally became more complex to ensure a good seal between the tire and the rim and the problem was exacerbated.

There have previously been proposed a number of different bead breakers, many of which are fixed and use hydraulic or pneumatic pressure to provide substantial axial forces to the tire and in all cases the wheel and tire are held against tilting movement relative to the axis whilst in many cases it is possible to rotate the wheel about the axis while the bead is being broken.

There have also been proposed certain portable bead breakers and one such device is illustrated in Australian Patent No. 487887 of Alec Muntro McGregor and, in this device also the wheel and tire remain flat during the operation of the device.

The desirability of having a portable bead breaker has increased with the advent of more leisure, which means that more motorists tend to visit areas away from tire and/or service stations and specifically with the increased use of 4-wheel drive vehicles for such use. The wheels and tires of 4-wheel drive vehicles are normally substantially larger and heavier than those of a normal automobile and these wheels and tires are consequentially more difficult to handle than the lighter automobile tires.

SUMMARY OF THE INVENTION

It is the object of the present invention to provide an improved bead breaker which operates more effectively than bead breakers previously proposed and which can readily cope with various sizes of wheels and tires.

It is a further object to make such a bead breaker which is portable.

The invention includes, in its broadest sense, a tire bead breaker having a base upon which a wheel and tire is initially adapted to be located, the base having, at one end, a stop to restrict outward movement of the wheel and tire, an arm assembly connected at one end to the base at a distance to be locatable on the side of a wheel and tire away from the stop and a breaker assembly pivotally connected to the arm assembly away from its point of connection with the base which breaker assembly includes telescopic members, one of which is connected to the arm and the other of which has a breaker plate at an end directed towards the wheel and tire, the assembly such that this member can be moved outwardly to enable the breaker plate to be located between the tire and the rim, the arrangement being such that on relative movement between the breaker assembly and the stop, the wheel and tire tend to rotate upwardly about the stop member, and means to cause rotation of the breaker assembly so that there is an inward and downward movement of the breaker plate to effect separation of the tire from the rim.

Preferably the arm assembly is pivotally connected to the base and preferably pivot of the breaker assembly can assume various positions on the arm to permit the most satisfactory arrangement between the breaker plate and the wheel.

Preferably the means whereby the breaker plate can be telescoped outwardly from the assembly can be by means of a screw or the like and it is preferred that the means for rotating the breaker assembly about its pivot comprises a hydraulic or screw jack located between the base and the free end of the breaker assembly.

These and further and other objects and features of the invention are apparent in the disclosure, which includes the above and ongoing written specification, including the claims and the drawings.

BRIEF DESCRIPTION OF THE DRAWINGS

FIG. 1 is a view of the bead breaker when the wheel and tire is initially located;

FIG. 2 is a view similar to FIG. 1 just before the bead has broken;

DETAILED DESCRIPTION OF THE INVENTION

The base and the breaker assembly of the bead breaker can both be considered to be made from square steel tubes although the specific materials of construction can be varied upon the particular application.

It will also be appreciated that the device can be made lighter or heavier depending upon the frequency and the ruggedness of operation expected and these variations can be obtained by either providing larger or smaller diameter tubes or tubes having different wall thicknesses.

Figure 3:
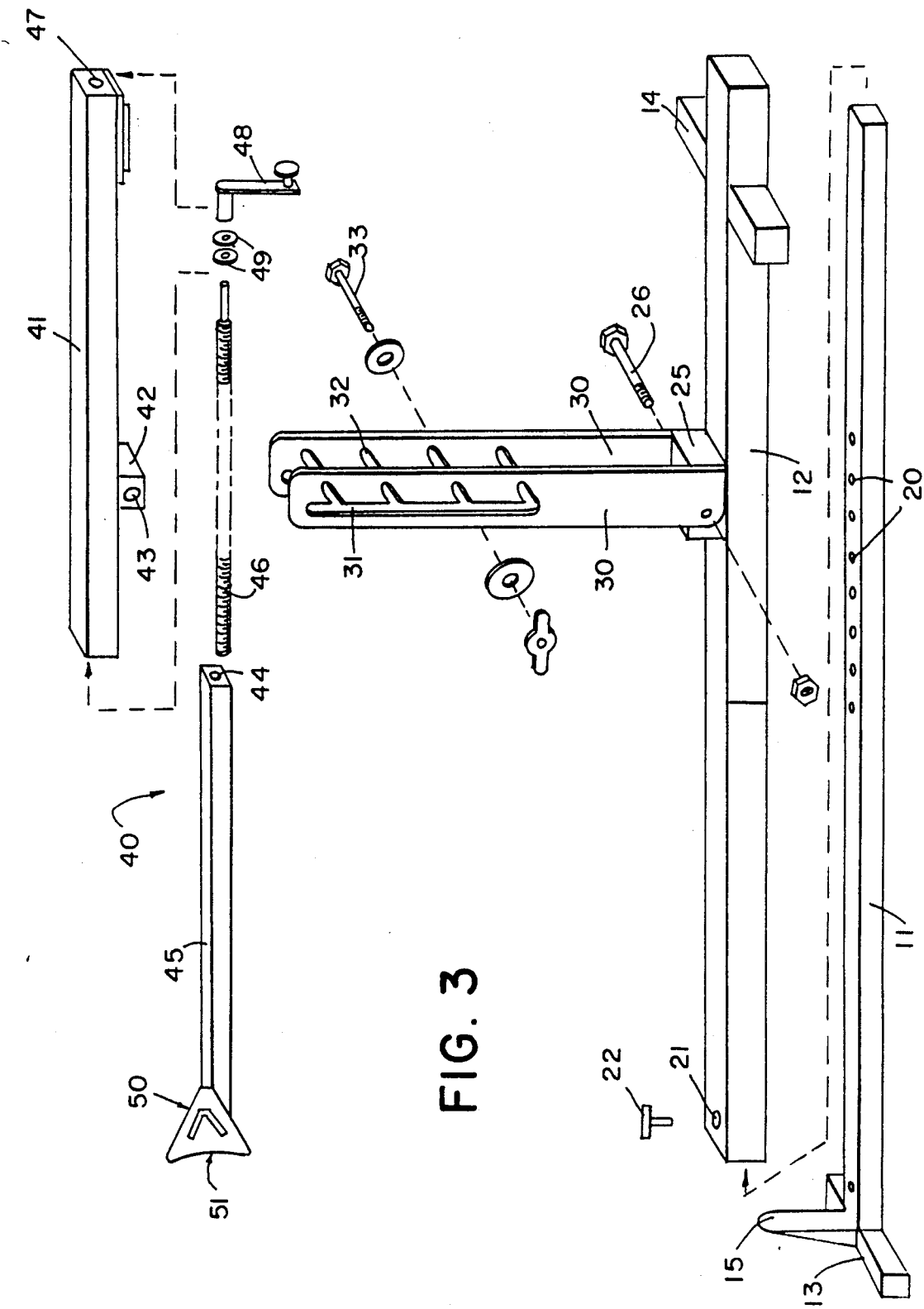
FIG. 3 is an exploded view showing the components of the bead breaker of FIGS. 1 and 2.

Referring to FIG. 3, the base 10 of the assembly can be formed of two telescoping members 11, 12, each of which can be a tube and each of which may have adjacent its outer end an outwardly extending member 13, 14 to provide stability on the ground.

We have found that the outwardly extending member 13, 14 can be short lengths of tube extending across the ends of these members 11, 12 or outwardly therefrom are satisfactory.

The member 11 has an upstanding member 15 at its free end which will act as a stop for a tire, as will be described hereinafter, and it is preferred that member 11 has a number of holes 20 therethrough which are adapted to be brought into alignment with one hole 21 on the other member 12. Member 12 may have one or more holes. Members 11 and 12 are engaged by a stud 22 or the like which can pass through the aligned holes 20, 21.

This arrangement simply provides for wheels of different diameters whilst, at the same time, permitting the bead breaker to be of a minimum size for ready storage and transport.

Located part way along the outer member 12 there may be an upwardly directed block 25 by way of pivot 26 to which there is connected a pair of arms 30.

These arms 30 may be of metal plate and adjacent their free end can each have an axial slot 31 which can be provided with recesses 32 therefrom, the purposes of which will be described hereinafter.

Pivotally affixed to these arms by means of a pivot 33 passing through the slot 31, there is a breaker assembly 40.

This may include a square tube 41 and may have a lug or the like 42 extending downwardly therefrom part way along the length thereof, which lug 42 is apertured at 43 and is adapted to receive the pivot 33. There is a second tube 45 which is telescoped into the first tube 41 and which has, on the end directed towards the stop, a breaker plate 50.

The breaker assembly 40 is arranged as a screw jack with a screw member 46 passing axially through an aperture 47 the outer end of the external tube 41.

This screw 46 passes through a threaded block or the like 44 on the end the internal tube 45 which, on its forward end, has the breaker plate 50.

At its other end the screw 46 has a handle 48 and is retained against axial movement in the aperture 47 by means of washers 49 or the like.

Figures 4, 5:
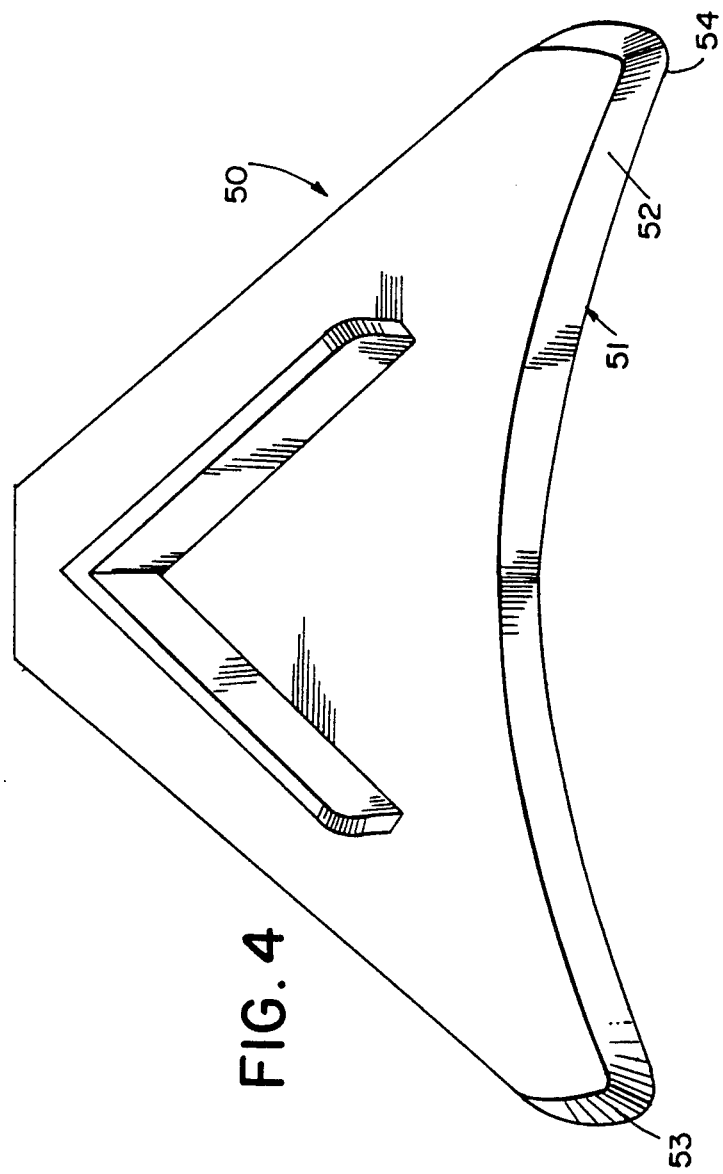
FIG. 4 is a plan view of the breaker plate used with the bead breaker.
FIG. 5 is a front elevation of this plate.

As shown in FIG. 4, the breaker plate 50 has an arcuate forward edge 51 which may be tapered or bevelled on its inner edge 52, the arrangement being such that the breaker plate 50 can be located between the rim of a wheel and the associated tire.

It is also preferred that the breaker plate is somewhat convex in place so that when it is brought into contact with a rim the two ends 53, 54 tend to make initial contact with the rim and the remainder makes contact as it is moves relatively thereto. It is also somewhat convex in elevation, as can be seen from FIG. 5 and when fully located, there is a space between the rim and the breaker plate adjacent the center of the plate.

As shown in FIG. 2, the free side of the breaker assembly 40 is adapted to have associated therewith means for rotating the assembly about its pivot 33 and, in a simple form, is adapted to receive the movable end of a hydraulic or screw jack 60 the other end of which will be located on the frame member 12. Any other form of device which can apply pressure between the breaker assembly and the base can also be used.

Alternatively a jack arrangement could be built in but this is generally not preferred.

As shown in FIG. 1, in operation the two telescoping parts 11, 12 of the base 10 are spaced such that a wheel and tire 65 can be laid on the base 10 with the tire 66 abutting the upstanding member 15 at the outer end thereof and with the pivoted arms 30 carrying the breaker assembly 40 being spaced from the diametrically opposite portion of the tire.

The breaker assembly is located along the grooves 31 in the arms 30 at a height above the height of the tire and when so located the pivot 33 enters one of the recesses 32 so that any axial movement relative to the arms is prevented.

The breaker plate 50 is moved about its pivot and, together with rotation of the jack screw 46 towards the tire until it can rest against the junction of the bead and the tire and further inward movement is effected by rotation of the screw 46 by its handle 48.

At this time the tire 66 at the upstanding member 15 tends to be compressed and the rim 67 rises because of the inward vector force provided by the breaker plate 50 and on further inward movement the breaker plate 50 moves towards the tire bead.

As illustrated in FIG. 2, the force applied to the tire has an inward component, because of the thickness of the breaker plate and because of the convex shape of this plate but the movement is normally not sufficient to break the bead from the rim.

When the breaker plate 50 has moved effectively inwardly as far as it can, then the jack 60 is located between the base 10 and the free end of the breaker assembly, which may be formed to ensure that the jack is positively located thereon, and the jack is extended.

At this time there is a complex movement of the inner edge 51 of the breaker plate.

This movement has a downward component, because of the rotation of the breaker assembly but also a forward component which tends to cause additional compression of the tire 66 against the upstanding member 15 and the combination of forces from the jack 60 itself and from the resilience of the tire 66 tends to cause the breaker plate and wheel to move "over center" so there is a strong inward force on the tire which will cause separation from the rim even where the bead is very firmly located.

Once the bead has been broken, that is has been moved into the wheel well, further operation can readily be carried out on the tire but it will be appreciated that it may be desirable when the bead is broken to release the jack, move the breaker plate rearwardly, partially rotate the tire and repeat the operation so that the tire is fully separated from the bead without manual labor.

The bead breaker of the invention, it will be seen, is simple to operate, and needs only an additional conventional jack or other pressure device for operation, and if a jack is to be used, it can be either a hydraulic jack or a screw jack either of the straight line or scissors type, it makes a difficult operation simple while at the same time being relatively compact and easy to carry.

In this specification while we have described one specific arrangement of bead breaker, we have already indicated that the materials of construction of this could readily be varied and various dimensions could also be changed.

It may be feasible, where the device is designed for, say, domestic use in normal cars that there be no adjustment of the position of the breaker sub assembly as most such cars have tires which differ in diameter by less than approximately 10 centimeters and in width by a similar amount.

Also we have described the mechanism to move the breaker plate forwardly as being a screw, it will be appreciated that this could be replaced by a hydraulic arrangement having a pump whereby the breaker plate can be moved outwardly or even a low geared electric motor drive and it would also be possible to provide a jack which is part of the assembly but for convenience of operation and economy we believe that a separate jack is preferable.

Also, instead of moving the breaker plate relative to the breaker assembly, it would be possible to provide the movement between the two parts of the base so the stop is caused to move towards the breaker assembly. This will give effectively the same action and movement of the wheel.

Also, while we have described this invention in relation to a portable bead breaker, it will be appreciative that it would be applied to a bench or pedestal member unit and the motive power could be mechanical or pneumatic or hydraulic.

While the invention has been described with reference to specific embodiments, modifications and variations of the invention may be constructed without departing from the scope of the invention, which is described in the following claims.

We claim:

1. A tire bead breaker comprising:
   a base upon which a wheel and tire is initially adapted to be located;
   a stop attached at one end of the base to restrict outward movement of the wheel and tire;
   an arm assembly having proximal and distal ends, wherein the proximal end of the arm is pivotally connected to the base at a desired position locatable on a side of the wheel and tire away from the stop near the other end of the base;
   a breaker assembly having first and second telescopic members, the first telescopic member being pivotally connected on the arm assembly at a point near the distal end of the arm assembly, and the second telescopic member having proximal and distal ends, wherein a breaker plate is attached to the distal end of the second telescopic member; and
   means for rotating the breaker assembly so that there is an inward and downward movement of the breaker plate to effect separation of the tire from a rim of the tire,
   wherein the second telescopic member is slidable outwardly relative to the first telescopic member of the breaker assembly, to enable the breaker plate to be located between the tire and the rim, and wherein further having means for inducing relative movement between the breaker assembly and the stop such that the wheel and tire tend to rotate upwardly about the stop member.

2. A tire bead breaker as claimed in claim 1 wherein the relative movement between the breaker assembly and the stop is achieved by a means which permits movement of the first and second telescopic members of the breaker assembly.

3. A tire bead breaker as claimed in claim 2 wherein the movement of the telescopic members are by means of a jack connected between the two members.

4. A tire bead breaker as claimed in claim 3 wherein the movement of the telescopic members are by means of a screw jack connected between the members.

5. A tire bead breaker as claimed in claim 1 wherein the arm assembly to which the breaker assembly is connected has an axial slot to permit the connection of the breaker assembly at different heights to accommodate tires and wheels of various thicknesses.

6. A tire bead breaker as claimed in claim 5 wherein the axial slot along which the breaker assembly can move, has at least two recesses at which the breaker assembly can be positively located.

7. A tire bead breaker as claimed in claim 1 wherein the breaker plate has outwardly directed arcuate ends, the radius of the arc being such that contact with the tire and wheel are initially at the ends of the breaker plate.

8. A tire bead breaker as claimed in claim 7 wherein the breaker plate is arcuate in front elevation so that, when it is located between the wheel rim and the tire there is a space between the rim and the breaker plate.

9. A tire bead breaker as claimed in claim 1 wherein the base has first and second members axially moveable relative to each other, the stop to restrict outward movement of the wheel being adjacent the free end of the first member and the arm assembly being on the second member and means for locking the first and second members in one of at least two positions so that a tire and wheel can be located between the stop and the arm assembly.

10. A tire bead breaker as claimed in claim 9 wherein the first and second members of the base have outward extensions to permit the base to be located on a surface in a stable manner.

11. A tire bead breaker comprising:
    a base having first and second telescoping members upon which a wheel and tire is initially adapted to be located;
    wherein the first and second telescoping members have outer ends respectively,
    an upstanding stop attached at the outer end of the first telescoping member of the base to restrict outward movement of the wheel and tire;
    an arm assembly having proximal and distal ends, wherein the proximal end of the arm is pivotally connected to the second telescoping part of the base at a desired position locatable on a side of the wheel and tire away from the stop near the other end of the base;
    a breaker assembly having first and second telescopic members, the first telescopic member being pivotally connected on the arm assembly at a point near the distal end of the arm assembly, and the second telescopic member having proximal and distal ends, wherein a breaker plate is attached to the distal end of the second telescopic member; and
    means for rotating the breaker assembly so that there is an inward and downward movement of the breaker plate to effect separation of the tire from a rim of the tire,
    wherein the second telescopic member is slidable outwardly relative to the first telescopic member of the breaker assembly, to enable the breaker plate to be located between the tire and the rim, and further having means for producing a relative movement between the breaker assembly and the stop such that the wheel and tire tend to rotate upwardly about the stop member.

12. The tire bead breaker of claim 11, wherein the first and second telescoping members of the base are axially moveable relative to each other, the stop to restrict outward movement of the wheel being adjacent to the free end of the first member and the arm assembly being on the second member, and means for locking the first and second telescoping members of the base in one of at least two positions, to accommodate wheels of different sizes when in use and to reduce the size of the base when in storage.

13. The tire bead breaker of claim 12, wherein the first and second telescoping parts of the base have outward extensions across the outer ends of the first and second telescoping members, respectively, to permit the base to be located on a surface in a stable manner.

14. The tire bead breaker of claim 11, further having means to permit movement of the first and second telescopic members of the breaker assembly so that the relative movement between the breaker assembly and the stop is achieved.

15. The tire bead breaker of claim 14, wherein the movement of the telescopic members are by means of a jack connected between the members.

16. The tire bead breaker of claim 15, wherein the movement of the telescopic members are by means of a screw jack connected between the members.

17. The tire bead breaker of claim 16, wherein the axial slot along which the breaker assembly can move has at least two recesses at which the breaker assembly can be positively located.

18. The tire bead breaker of claim 17, wherein the breaker plate is arcuate in front elevation and the arc is convex in place, so that, when it is located between the wheel rim and the tire there is a space between the rim and the breaker plate.

19. The tire bead breaker of claim 11, wherein the arm assembly to which the breaker assembly is connected has an axial slot to permit the connection of the breaker assembly at different heights to accommodate tires and wheels of various thicknesses.

20. The tire bead breaker of claim 11, wherein the breaker plate has an outwardly directed arcuate ends, the radius of the arc being such that contact with the tire and wheel are initially at the ends of the breaker plate.

* * * * *